United States Patent Office 3,354,226
Patented Nov. 21, 1967

3,354,226
DERIVATIVES OF CHLOROMETHYLATED
DIPHENYL ETHERS
Ehrenfried H. Kober, Hamden, and Henry F. Lederle,
North Haven, Conn., assignors to Olin Mathieson
Chemical Corporation, a corporation of Virginia
No Drawing. Filed Feb. 25, 1964, Ser. No. 347,132
5 Claims. (Cl. 260—613)

This invention relates to fluids which are the reaction products of chloromethylated diphenyl ethers and a fluoroalcohol or mixtures of fluoroalcohols. More specifically, this invention relates to diphenyl ether derivatives of the formula:

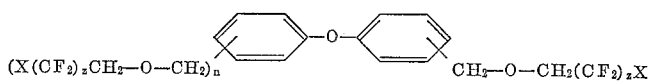

$(X(CF_2)_zCH_2—O—CH_2)_n$ ... $CH_2—O—CH_2(CF_2)_zX$ where $z$ is an integer of from 1 to 7 inclusive, $n$ is an integer of from 0 to 2 inclusive, and X is hydrogen or fluorine.

Typical starting materials include monochloromethyl diphenyl ether, bis(chloromethyl)diphenyl ether, tris(chloromethyl)diphenyl ether, mixtures of the foregoing and the various isomers of these compounds.

Fluoroalcohols utilized in the process of this invention have the formula:

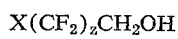

$X(CF_2)_zCH_2OH$ where X is hydrogen or fluorine and $z$ is an integer of from 1 to 7 inclusive. Suitable alcohols include 1,1-di-H-trifluoroethanol, 1,1,2-tri-H-difluoroethanol, 1,1,3-tri-H-tetrafluoropropanol, 1,1-di-H-pentafluoropropanol, 1,1,4-tri-H-hexafluorobutanol, 1,1,5-tri-H-octafluoropentanol, 1,1,7-tri-H-dodecafluoroheptanol, etc. Although the stoichiometric quantity of the alcohol can be reacted with the chloromethylated diphenyl ether starting materials, the amount of alcohol employed can be as much as twice the stoichiometric requirement.

The fluorinated alcohols can be admixed with such branched-chain alcohols as the following: 2,2,4-trimethylpentanol, 2-ethyl-hexanol, 2-methyl-butanol, 3-methyl-butanol, amyl alcohol mixtures, 2-methyl-pentanol, 2-ethyl-butanol, tetrahydropyran-2-methanol, and branched-chain isomers of these and other alcohols, such as α,α-dimethyl alcohols of the formula:

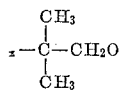

$$x-\overset{CH_3}{\underset{CH_3}{C}}-CH_2O$$

where $x$ ranges from 0 to 12 and branched alcohols derived from the oxo process, such as the commercial isooctyl alcohols.

This process of this invention is preferably conducted in the presence of an acid scavenger such as sodium hydroxide or potassium hydroxide. Other materials may also be employed, e.g. pyridine, triethylamine, sodium hydride, sodium metal, potassium metal or sodium alkoxides.

Advantageously, the reaction is carried out in the presence of an inert solvent such as benzene, toluene, xylene, etc. The reaction temperature generally will range from about 60° C. to about 160° C., and preferably will be from 75° C. to 145° C. When a solvent is employed, it has been found convenient to operate at reflux temperature. The reaction time can be varied widely from about 2 to about 48 hours and preferably will be from about 12 to about 30 hours depending upon the particular reaction conditions employed. The reaction can be conveniently operated at atmospheric pressure, however, sub-atmospheric pressures as well as pressures of up to several atmospheres can be used.

The compounds of this invention are preferably used as lubricants or as functional fluids. However, the instant application is in no way limited to such uses.

The petroleum based functional fluids are limited in their applications by their high flammability. The products of this invention, however, are highly fire resistant as evidenced by their spontaneous ignition temperatures. While many synthetic fluids possess hydrolizable groups (e.g. the aliphatic esters, the silicate esters and the phosphate esters) the products of this invention contain no hydrolizable groups and are therefore hydrolytically stable. The well known polyphenyl ethers have excellent thermal and oxidative stability, but their low temperature properties are not satisfactory for many applications. (Pour points are above 32° F.) However, the products of this invention have good low temperature properties, and in addition, due to their fluorine content, increased lubricity is obtained.

This invention is illustrated by the following examples which are to be considered not limitative.

Example I

This example illustrates the reaction of crude monochloromethyl diphenyl ether,

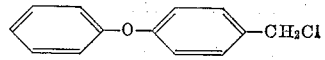

...—O—...—$CH_2Cl$ with a 1,1,7-tri-H-dodecafluoroheptanol,

$H(CF_2)_6CH_2OH$

A three-necked flask was charged with 56.4 g. (1.25 moles) of a 53.3% sodium hydride suspension in mineral oil and washed with seven 150 ml. portions of ether to remove the bulk of the mineral oil. While the mixture was stirred, 415 g. (1.25 moles) of 1,1,7-tri-H-dodecafluoroheptanol in 415 ml. of ether was added at such a rate that gentle spontaneous refluxing resulted. After addition of the alcohol was completed, the bulk of the ether was distilled off to a pot temperature of about 50° C. Toluene (500 ml.) was then added and distillation to remove the remainder of the ether was resumed until a temperature of about 100° C. (bottoms) was reached. (During the ether stripping, it is important not to permit the slurry to become dry or to cake along the edges of the flask, as this may result in decomposition of the alcoholate.)

The crude monochloromethyl diphenyl ether, 209 g., containing one equivalent of chlorine, in 209 ml. of toluene was then added at about 100° C. After addition was completed, refluxing and stirring were continued for 23 hours. The cooled product was then extracted with 5% aqueous potassium hydroxide, followed by extraction with 5% aqueous sodium sulfate. The organic layer was stripped first to 170° C. (bottoms) at atmospheric pressure, then to 190° C. at water aspirator pressure and finally at 160° C. overnight in high vacuo. The crude yield, after filtration through filter aid, was 297 g.=57.8% of the theory. (Most losses were due to emulsification during the extractions.)

The two main fractions from the subsequent distillation (32.0% overall yield), which were combined, had the following physical properties: Boiling point 180–234° C./0.03–0.9 mm.; refractive index $n_D^{25}$=1.4746; K.V. 100° F. 36.4 cs.; K.V. 210° F 4.72; ASTM slope 0.85; density 1.39; spontaneous ignition 1025° F.; pour point —5° F.

Example II

This example illustrates the reaction of crude bis(chloromethyl)diphenyl ether,

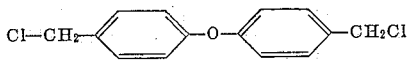

with 1,1,5-tri-H-octafluoropentanol,

$$H(CF_2)_4CH_2OH$$

The procedure of Example I was followed.

The following quantities were employed: Sodium hydride, 53.3% suspension in mineral oil, 1.87 moles, 84.3 g., 1,1,5-tri-H-octafluoropentanol, 1.87 moles, 434 g., and crude bis(chloromethyl)diphenyl ether, 200.0 g. containing 1.5 equivalents of chlorine. Crude yield, before distillation, 81.5%.

The product was distilled. The combined main fractions from this distillation (38.7% of the theory) had the following physical properties: Boiling point 180–216° C./0.08–0.09 mm.; refractive index $n_D^{25}=1.4487$; K.V. 100° F. 55.5 cs.; K.V. 210° F. 6.2 cs.; ASTM slope 0.82; density 1.44; spontaneous ignition 625° F.; pour point −20° F.

Example III

In this example, the reaction of crude tris(chloromethyl) diphenyl ether,

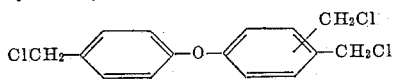

and 1,1-di-H-trifluoroethanol,

$$F_3C-CH_2OH$$

was performed using the procedure set forth in Example I.

The following materials were employed: Sodium hydride, 53.3% suspension in mineral oil, 2.50 moles, 112.5 g., 1,1-di-H-trifluoroethanol, 2.50 moles, 250.0 g., and tris(chloromethyl) diphenyl ether 222.0 g., containing two equivalents of chlorine. Crude yield, before distillation, 89.3%.

The main fraction from the distillation overall yield 41.2%, had the following physical properties: Boiling point 211–235° C./0.3–0.9 mm.; refractive index $n_D^{25}=1.4803$; K.V. 100° F. 34.5 cs.; K.V. 210° F. 4.81 cs.; ASTM slope 0.82; density 1.32; spontaneous ignition 900° F.; pour point −20° F.

Example IV

The procedure of Example I was followed.

A purified bis(chloromethyl) diphenyl ether was used. The following quantities of reactants were employed: Sodium hydride, 53.3% suspension, 1.875 moles, 84.5 g., 1,1,5-tri-H-octafluoropentanol, 1.875 moles, 435 g., bis(chloromethyl) diphenyl ether, 0.75 mole, or 1.50 equivalents of chlorine, 200 g. The crude yield was 68.4% of the theoretical yield.

The major fractions (combined), overall yield 45.7% had the following physical properties: Boiling point 188–228° C./0.2–0.7 mm.; refractive index $n_D^{25}=1.4614$; K.V. 100° F. 57.9 cs.; K.V. 210° F. 6.4 cs.; ASTM slope 0.78; density 1.40; spontaneous ignition 650° F.; pour point −15° F.

Example V

In this example, purified bis(chloromethyl) diphenyl ether was reacted with two different alcohols, namely 2,2,4-trimethylpentanol and 1,1-di-H-trifluoroethanol. An unsymmetrically substituted material was produced.

The procedure of Example I was followed. The following quantities of reactants were used: Sodium hydride, 53.3% suspension in mineral oil, 2.50 moles, 112.5 g., 1,1-di-H-trifluoroethanol, 1.25 moles, 125 g., 2,2,4-trimethylpentanol (added together with the fluoroalcohol) 1.25 moles, 163 g., bis(chloromethyl) diphenyl ether, 1 mole=2 chlorine equivalents 267.0 g. The yields were essentially quantitative except for losses due to emulsification during the extractions.

The major fractions (combined) had the following properties: Boiling point 127–223° C./0.08–1.5 mm.; refractive index $n_D^{25}=1.5045$; K.V. 100° F. 15.5; K.V. 210° F. 3.49; ASTM slope 0.75; density 1.10; spontaneous ignition 875° F.; pour point −40° F.

Example VI

A simplified procedure includes the following steps:

A three-necked flask equipped with a stirrer, azeotrope trap and condenser was charged with 247 g. of 1,1,3-tri-H-tetra-fluoropropanol (1.87 moles), crude bis(chloromethyl diphenyl ether, 200 g. (1.50 equivalents chlorine), 115 g. of potassium hydroxide (1.87 moles calculated at 90%), and 1000 ml. of toluene. Heating, stirring and azeotroping were started, and heated and stirring were continued for 16 hours after azeotroping had stopped. The product was isolated as described under Example I.

A representation fraction (12.6% of the theory) had the following properties: Boiling point 178–202° C./0.47 mm.; refractive index $n_D^{25}=1.4952$; K.V. 100° F. 30.8 cs.; K.V. 210° F. 4.41 cs.; ASTM slope 0.84; density 1.31; spontaneous ignition 875° F.; pour point −15° F.

Example VII

A hydrolytically stable fluid was prepared by using the product of Example II. The fluid product of Example II was stirred with an equal weight of 10% aqueous potassium hydroxide at 100° C. for 16 hours. The cooled mixture was washed with water until neutral, and then dried over phosphorus pentoxide in a vacuum desiccator. The fluid was stirred with 2.5% by weight of activated carbon at 60–80° C. for about one hour and filtered through a filter aid. The foregoing treatment was then repeated once more. Results of the hydrolytic stability test carried out as described in military specification MIL-H-19457A (Ships) were as follows:

| | Product of Example VII | Allowable Under MIL-H-19457A (Ships), max. |
|---|---|---|
| Copper corrosion | −0.031 mg./cm.² | −0.3 |
| Total Acidity of Water | 0.86 mg. KOH | 5.0 |
| Acid Number of fluid | 0.01 mg. KOH/g | 0.2 |

Example VIII

The following procedure also gives hydrolytically stable products. It avoids the treatment with a base which sometimes results in the forming of emulsions; also a cheaper grade of charcoal was used.

The product of Example IV was distilled again and the material of B.P. 199–226° C./0.05–0.03 mm. was treated twice with activated carbon as described in Example VII. This fluid passed the hydrolytic stability test (MIL-H-19457A (Ships)) as follows:

| | Product of Example VIII | Allowable Under MIL-H-19457A (Ships), max. |
|---|---|---|
| Copper corrosion | −0.03 mg./cm.² | −0.3 |
| Total Acidity of Water | 0.75 mg. KOH | 5.0 |
| Acid Number of fluid | 0.01 mg. KOH/g | 0.2 |

What is claimed is:

1. A reaction product prepared by (A) first reacting a fluoroalcohol of the formula:

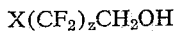

$$X(CF_2)_zCH_2OH$$

wherein X is hydrogen or fluorine and z is an integer of from 1 to 7 inclusive, with the stoichiometric quantity of a material selected from the group consisting of sodium, sodium hydroxide, potassium hydroxide and sodium hydride, to form the corresponding alkali metal fluoroalcoholate, and (B) reacting the said fluoroalcoholate at a temperature of from about 60° to about 160° C. and in the presence of an inert solvent selected from the group consisting of benzene, toluene, and xylene, the amount of said fluoroalcohol employed varies from the stoichiometric quantity to twice the stoichiometric requirement, based on the chloromethylated diphenyl ether reactant, of the formula:

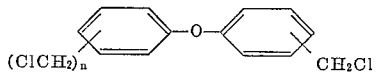

wherein $n$ is an integer of from 0 to 2 inclusive whereby forming the said reaction product.

2. The reaction product of claim 1 wherein the said ether is monochloromethyl diphenyl ether and the said fluoroalcohol is 1,1,7-tri-H-dodecafluoroheptanol.

3. The reaction product of claim 1 wherein the said ether is bis(chloromethyl) diphenyl ether and the said fluoroalcohol is 1,1,5-tri-H-dodecafluoroheptanol.

4. The reaction product of claim 1 wherein the said ether is tris(chloromethyl) diphenyl ether and the said fluoroalcohol is 1,1-di-H-trifluoroethanol.

5. The reaction product of claim 1 wherein the said ether is bis(chloromethyl) diphenyl ether and the said fluoroalcohol is a mixture of 2,2,4-trimethylpentanol and 1,1-di-H-trifluoroethanol.

References Cited

UNITED STATES PATENTS

| | | | |
|---|---|---|---|
| 2,267,733 | 12/1941 | Hansley | 260—632 |
| 3,170,959 | 2/1965 | Trapp | 260—613 |
| 3,265,741 | 8/1966 | Sheppard | 260—613 |

FOREIGN PATENTS

| | | |
|---|---|---|
| 1,321,757 | 2/1963 | France. |
| 552,739 | 4/1943 | Great Britain. |

OTHER REFERENCES

Derwent Belgian Patents Report, October 1962, No. 95 A. 5: General Organic—p. 4.

Gunderson et al., Synthetic Lubricants (1962), pp. 454, 458.

Rodd, Chemistry of Carbon Compounds, vol. 1A (1951), p. 321.

BERNARD HELFIN, *Primary Examiner.*